Feb. 23, 1960

C. E. EVANSON 2,925,932

EYELETTING MACHINE

Filed Dec. 5, 1956

INVENTOR.
Clifford E. Evanson
BY

Griswold & Burdick
ATTORNEYS

Feb. 23, 1960   C. E. EVANSON   2,925,932
EYELETTING MACHINE

Filed Dec. 5, 1956   3 Sheets-Sheet 2

INVENTOR.
Clifford E. Evanson
BY
Griswold & Burdick
ATTORNEYS

Feb. 23, 1960  C. E. EVANSON  2,925,932
EYELETTING MACHINE
Filed Dec. 5, 1956  3 Sheets-Sheet 3
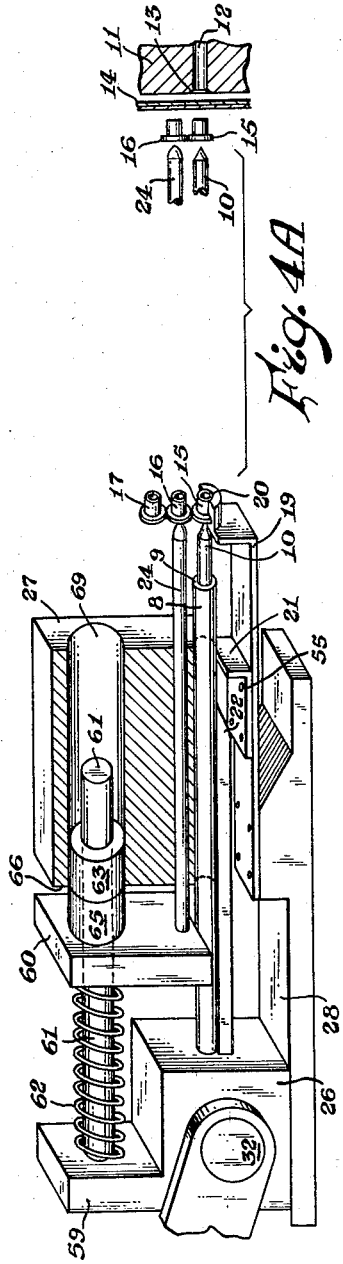
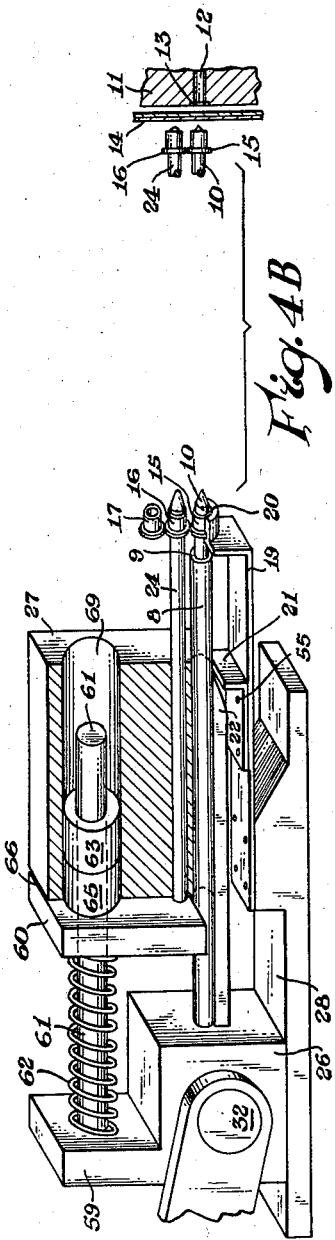
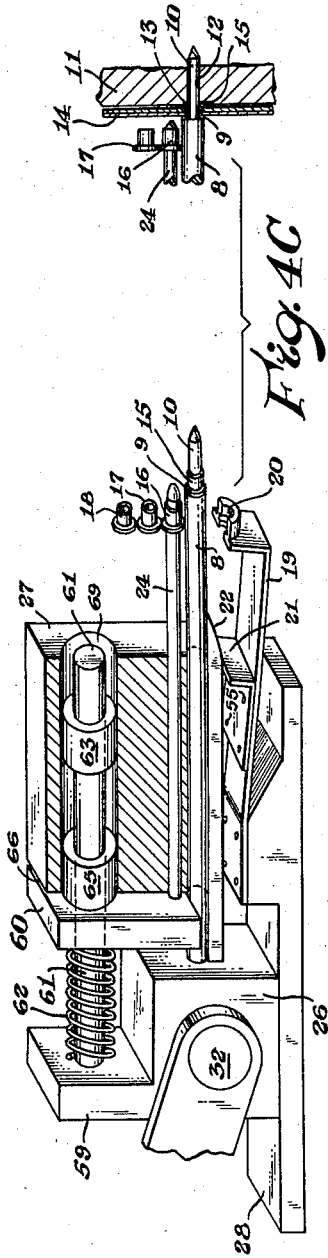
INVENTOR.
Clifford E. Evanson
BY
Griswold & Burdick
ATTORNEYS United States Patent Office 2,925,932
Patented Feb. 23, 1960

2,925,932
EYELETTING MACHINE

Clifford E. Evanson, Chicago, Ill., assignor to The Dow Chemical Company, Midland, Mich., a corporation of Delaware Application December 5, 1956, Serial No. 626,422

8 Claims. (Cl. 218—15)

This invention relates to eyeletting performed at extremely rapid rates, preferably in a horizontal manner of operation. It has reference to high speed, advantageously horizontal, eyeletting apparatus.

In complex manufacturing installations that include eyeletting in a plural sequence of integrated operations, especially in composite assemblies of the indicated nature, it may frequently be highly advantageous for the eyelets to be horizontally inserted in the particular articles being manufactured. And, as can readily be appreciated, high speed eyeletting under such circumstances would be a desideration of no minor significance to possibilitate maximum production efficiencies from a given multiple-functioning installation.

The various eyeletting machines and devices known to the art are, in general, not suited for such purposes. They have ordinarily been devised to feed and set the eyelets in a vertical position and are incapable of attaining unusually high rates of production in excess of, say, thirty to fifty insertions per minute. This, in no small measure, may be attributed to the inherent mechanical limitations of the known eyeletting contrivances which generally require that the considerable inertia of bulky and heavy intermittently moving parts be overcome during the setting of each eyelet and which usually are also severely limited by the time that is consumed in physically moving each eyelet from a captured feed position in the apparatus to a position therein where it can be inserted and set in the desired article. United States Letters Patent Nos. 1,997,438; 2,018,936 and 2,069,241, typify the conventional eyeletting appliances and are aptly illustrative of the cumbersome moving parts and relatively long, tortuous and inexpedient eyelet feeding means that are generally therein involved. A multiplicity of more recently granted Letters Patent are merely representative of several variations and modifications of the customarily utilized form.

It is among the principal objectives of the present invention to provide a significant improvement in the eyeletting art characterized in and by apparatus that is capable, with remarkable celerity, of horizontalized eyelet feeding and setting operations at rates substantially less than a second per insertion so that as many as two to ten or more eyelets per second could easily be fabricated into articles being handled in vertical disposition on a mass production basis. It is also an objective of the invention to provide apparatus that, for all practical purposes, can effectively accomplish the eyeletting of desired articles about as rapidly as the articles to be eyeletted can be sequently moved into eyeletting position in the apparatus. Corollary objectives and other salutary features are manifest in the embodiment of apparatus according to the invention which is didactically included in the following description and specification, taken in connection with the accompanying drawing, wherein;

Figure 1:
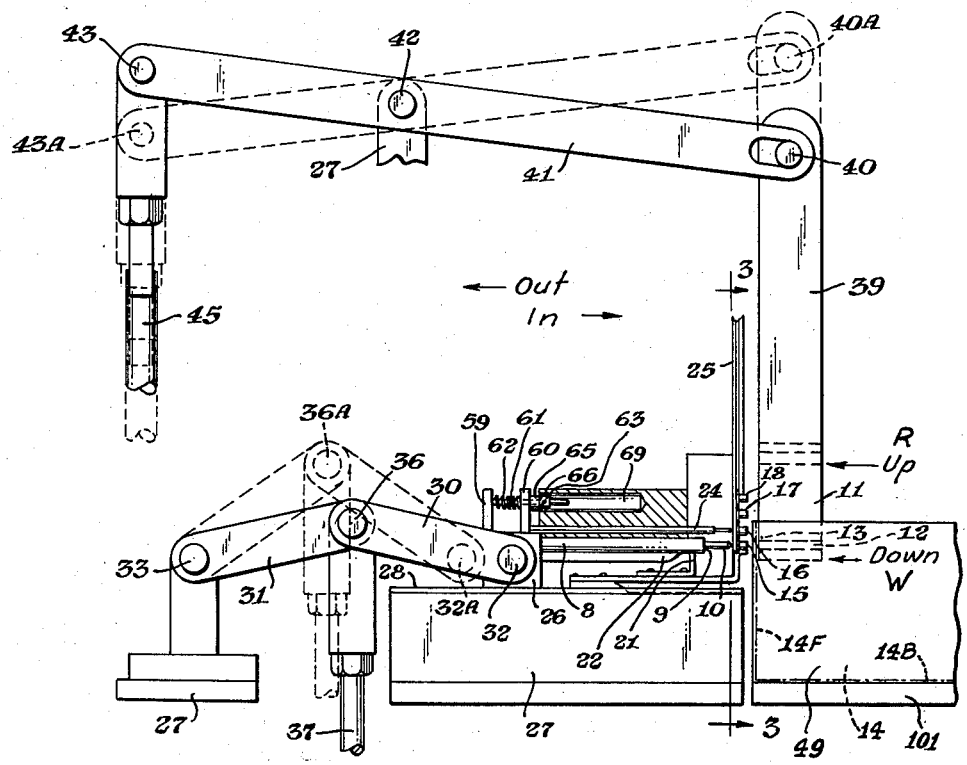
Figure 1 is a side view of the apparatus.
Figure 5:
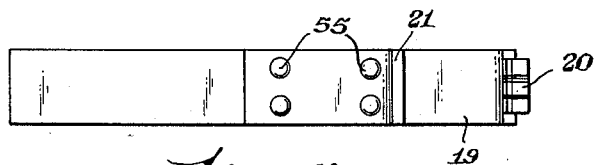
Figure 6:
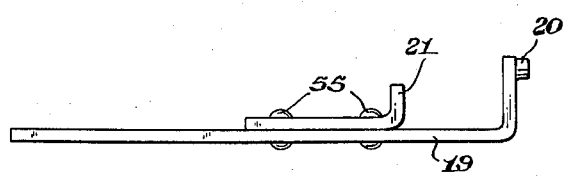
Figure 7:
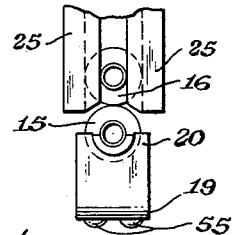

Figures 4A, 4B and 4C, perspective views that are on an enlarged scale and partly in section, particularly depict the eyeletting elements of the complete apparatus shown in Figure 1 and are arranged to illustrate sequential positions assumed by such elements during a complete eyeletting stroke of the apparatus and, in respective connection with each view, schematically illustrate (in separate fragmentary elevations) the sequential eyeletting actions of the elements; and Figures 5, 6 and 7, in top, plan and front views, respectively, that are also on an enlargened scale, illustrate an essential part of the eyelet handling arrangement utilized in the apparatus shown fully in Figure 1.

With initial reference to the general view of Figure 1, there is shown eyeletting apparatus which comprises a horizontally disposed and operating punch 8 in cooperative arrangement with a vertically disposed anvil 11, which advantageously may be of the movable variety to embrace one of the principles taught in U.S. Patent No. 2,176,304. A vertically disposed track 25 feeds a plurality of eyelets from a supply hopper (not shown) to the punch for insertion in a vertically disposed work piece 14, shown in fragmentary phantom elevation in dot-dash outline, which work piece is moved into position between the punch 8 and anvil 11 in order to be eyeletted. Advantageously, the work piece 14 is held in position during the eyeletting operation by suitable supports or positioning fixtures, hereinafter only typically represented. Several eyelets 16, 17 and 18 are shown in a free falling feed position in the track 25. Obviously, in actual operation, the track 25 is filled with eyelets from the feed hopper.

The eyelet 15 from the bottom of the track 25 is held by a suitable socket or eyelet-accepting recess 20 in an L-shaped eyelet release and holder spring or resilient arm 19, detailed in Figures 5, 6 and 7, that captures each eyelet in the socket portion 20 as the eyelet drops freely from the lowermost position in the track 25 and retains it until caught by the nose 10 of the punch 8 during the forward stroke of the punch. As is apparent, the oncoming eyelet 16, which has been fed to the penultimate position pending insertion while remaining in track 25, is in immediately adjacent physical contact with the eyelet 15 being inserted. This arrangement advantageously minimizes delays in the eyeletting sequence that might be occasioned by the time intervals required to pass the eyelets being supplied for insertion through a longer feed path since, in accordance with the present invention, the oncoming eyelet in the penultimate position need only fall a distance equal to its own head-diameter (or a distance equal to an equivalent dimension, if other than round eyelets are employed) in order to arrive at the position for being inserted and set in the work piece. The spring 19 is fastened on a stationary support frame 27 for part of the assembly. The eyelet 15 is thus driven by the shoulder 9 of the punch 8, to be inserted through the work piece 14 and set against the annular eyelet deforming recess 13 in anvil 11. The nose 10 of the punch 8 enters an accommodating aperture 12 in the anvil 11 during the eyelet setting interval in which the eyelet is deformed against the recess 13 in the anvil about the aperture 12 to achieve the desired fastening effect with the eyelet.

During the forward stroke of the punch 8, a wedge member 22, attached to the underside of the punch, engages so as to act upon and push against a projecting ridge or abutment 21 on the spring 19. As shown in Figures 5-7, the abutment 21, which is physically contacted by the wedge member 22, may be held on the spring 19 by means of rivets 55 or by other suitable fasteners. Or, as is apparent, it may be made integral therewith. The spring 19 is thus forced down and depressed out of the way of the punch 8 as the eyelet which has fallen from the bottom of the track 25 into the socket or holder portion 20 of the spring 19 is being impaled by the punch in its position of retention in said socket portion 20 of the holder spring 19 for insertion in the work piece 14. The nose 10 of the punch 8 must be long enough so that it can enter the eyelet 15 being held by the socket portion 20 of the spring 19 before the wedge member 22 on the punch starts to force the spring out of the way of the traveling punch. The wedge member 22 must also be sufficiently angled (or inclined) so that it forces the spring 19 sufficiently out of the way to adequately clear the punch 8 during the completion of the eyelet setting stroke after the punch has captured the eyelet from the socket portion 20 of the spring 19. During the eyelet setting motion of the punch 8, a synchronized eyelet arresting rod 24, also cooperative with the punch, moves with the stroke of the punch to catch the lowermost eyelet actually in the track 25 (eyelet 16). This holds the penultimately positioned feed eyelet 16, which is physically adjacent to the eyelet 15 being set, out of the way of the punch 8 until it has been retracted for the subsequent stroke. As is indicated and apparent herein, the feed eyelet 16 (i.e., the eyelet being actually fed, or which is immediately feeding, from the lowermost position in the end of track 25) is held by the arresting rod 24 at a point spaced immediately beside (and on a center that is at about an eyelet diameter from the center of) the eyelet 15 being set. The eyeletting action of the apparatus, which is hereinafter more particularly described, is illustrated in greater detail in the sequential views of Figures 4A, 4B and 4C of the drawing.

The punch 8 is mounted on a yoke member 26 that is slidably positioned on a bearing block portion 28 of the stationary frame support 27. A pair of lever arms 30 and 31, connected at their inner ends by means of a central pintle 36 to one another and to a reciprocating toggle rod 37, actuate the punch-supporting yoke in a back and forth manner. The drive lever 30 is also journaled at bearing 32 to the yoke 26 in order to transmit power from the toggle rod 37 to the yoke 26. The guide lever 31 connects at its outer extremity to a gudgeon support 33. The toggle rod 37 is motivated by a means (not shown) consisting of a timed cam and, advantageously, may be spring loaded in a known manner to permit a rapid eyelet setting interval.

The magnified perspective views of Figures 4A, 4B and 4C, taken in connection with Figure 1, more clearly illustrate the eyeletting elements that have been mentioned of apparatus embodied within the purview of the invention and, in addition, more clearly show one form of mechanism for operating the eyelet arresting rod 24. They also, as has been mentioned, clearly illustrate the sequential action and motion of the eyeletting elements during a complete eyelet setting stroke of the apparatus. Thus, the arresting rod 24 is fixedly mounted to a movable block 60 which is slidably journaled on a slide bar 61 which is held by a bracket portion 59 of the yoke 26. A driving spring 62 is positioned around the bar 61 and urges the block 60 away from the bracket portion 59. A retractor collar element 63 is fixedly positioned about the bar 61 opposite a projecting guide sleeve 65 integral with the block 60, said element and sleeve acting to hold the slide bar 61 against the action of the spring 62 when the apparatus is in its rest position, as is particularly shown for the eyeletting elements in Figure 4A of the drawing. The retractor 63, being fixed to slide bar 61, will upon movement of the yoke 26, travel with the slide bar 61 and the guide sleeve 65 being integral with the block 60 will move into a recess 69 that has been provided in the adjacent portion of the support frame 27. The block 60 (carrying the eyelet arresting rod 24) moves only a portion of the distance that is spanned by the slide bar 61 (which moves the entire distance that is covered by the punch-carrying yoke 26). A solid stop surface 66 about the slide bar receiving recess 69 in the frame 27 catches and holds the block 60 after it has progressed a sufficient distance of travel to permit the rod 24 to impale the eyelet 16 that remains lowermost in the track 25. This is shown in Figure 4B of the drawing, which also illustrates the simultaneous impaling of the eyelet 15 from the socket portion 20 of spring 19 by the punch 8 in forward travel during its stroke. The rod 24 thus is moved only the predetermined distance necessary for it to arrest the immediately adjacent lowermost eyelet 16 in the track 25 (not shown in Figures 4A, 4B or 4C) while the punch 8 is impaling the eyelet 15 to be set from the socket portion 20 of spring 19 and inserting it in the work piece 14.

Further movement of the yoke 26 during the eyelet setting portion of its forward stroke (depicted as at the end of the stroke in Figure 4C of the drawing) does not carry the eyelet arresting rod 24 beyond a position in which it merely captures the penultimately positioned eyelet (eyelet 16), that is, the eyelet which is lowermost in the track 25. Although the punch 8 and arresting rod 24 move forward during the initial interval of the forward stroke of the eyeletting elements, their individual movements are not coterminous nor are their distances of travel coextensive. The arresting rod 24 travels a much shorter distance than the punch 8 and, as has been explained, is arranged to stop short of the work piece 14 while impaling the eyelet 16 in penultimate position, that is, lowermost in the track 25, at the same time that the punch is picking up the eyelet 15 from the socket portion 20 of spring 19 for insertion through and setting in the work piece. During the actual eyelet setting interval of the stroke after the forward motion of the arresting rod 24 has been stopped, the spring 62 is compressed against the block 60 which is stationarily maintained against the stop surface 66 to hold the eyelet arresting rod in a steady position.

After the eyelet has been inserted and the forward stroke has been completed, the retractor element 63 brings the block 60 and arresting rod 24 back to their original positions of rest (as in Figure 4A) while a new work piece is being moved into position.

The anvil 11 is held on a slide 39 which is linked at its upper extremity to a raise arm 41 by means of a pivot journal 40. The slide 39 and anvil 11 are advantageously raised after each eyeletting operation to the rest position (designated by the capital letter "R") to permit movement of the work piece 14 into and out of eyeletting position. Such motion is particularly beneficial since the eyeletting is accomplished at a level in the vertically disposed work piece that is beneath its uppermost edge. The anvil-raising arm 41 is mounted at a suitable trunnion point 42 (which may be an extension of the stationary frame support 27) and connects at the link coupling 43 to a shaft 45. The shaft 45 is also actuated by a suitable cam means (not shown), synchronized with the cam that actuates the toggle rod 37, to lower the anvil 11 into an aligned position with the punch before each eyelet inserting operation. Such a working position is designated as the lower position "W" for the anvil in the drawing. Retraction of the shaft 45 to raise the anvil moves the linkages 40 and 43 to the positions 40A and 43A that are illustrated in outline in the drawing. This results in the actuating arm 41 assuming the position that is represented for it in phantom outline. The slide 39 may advantageously be provided with lateral vertical grooves 46 which facilitate its being accurately guided along suitable insert strips 47 (shown in Figure 2) held rigidly in the assembly for such purpose.

Figure 2:
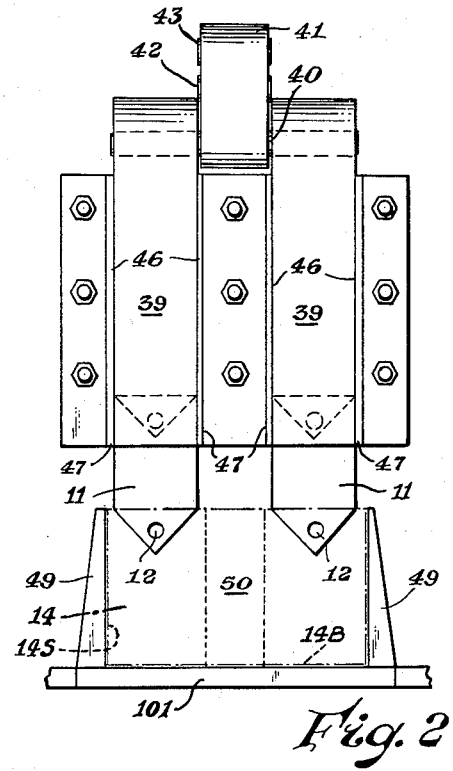
Figures 2 and 3 are front elevations of the anvils and the eyelet feed tracks, respectively, of a duplex eyeletting apparatus constructed in accordance with the invention having the same essential features as the apparatus depicted in side elevation in Figure 1.
Figure 3:
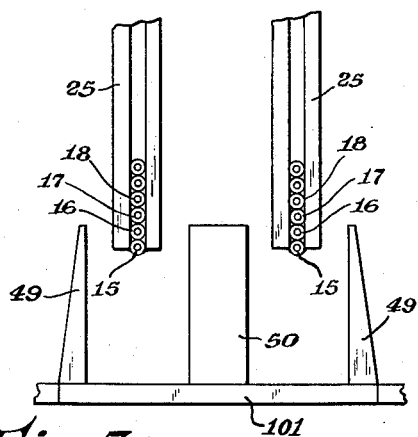

Advantageously, as depicted in Figures 2 and 3, apparatus according to the invention may be embodied in a duplex eyeletting contrivance in which two (or more) eyelets are simultaneously inserted in a desired work piece at a single eyeletting station. In Figure 3, each of the eyelet feed tracks 25 of the apparatus is depicted at the level of the line of approach of the corresponding punch and eyelet setting means of the apparatus cooperatively associated with said punch. For clarity and convenience, no work piece is illustrated as being in position in this view. Figure 2, taken in elevation from behind the anvils (that is, from the rear of the apparatus) in the direction in which the punches travel during the simultaneous duplex eyelet setting operations, shows the anvils 11 lowered to "down" positions (with their "up" positions indicated in dotted outline) and a work piece 14, represented in phantom, dot-dash outline, positioned between the lowered anvils and the punches. As shown, the phantomly-depicted work piece 14 is in place for eyeletting by the apparatus. As is apparent, of course, single eyeletting apparatus would have analogous characteristics. In addition to what is detailed in Figure 1, Figures 2 and 3 show adjacent upright work-piece-positioning fixtures 49 and 50, mounted on a support base 101 therefor (and for the work piece), which may advantageously be incorporated in the apparatus.

In operation, at the start of each eyeletting cycle, the anvil 11 is in a raised position and the yoke 26 is retracted, i.e. in the "out" position, as shown in the dotted outline of Figure 1. A work piece is moved into place and the anvil is lowered to its working position through movement of the shaft 45 and anvil-raising arm 41. When the work piece and anvil are in the proper predetermined alignment, that is, with the work piece 14 resting on the support 101 and with front wall 14F of the work piece backed by the anvil, the toggle rod 37 is actuated downwards. This forces the punch-supporting yoke through a forward, i.e., "in" stroke, as has been explained in connection with Figures 4A, 4B and 4C, to accomplish the eyeletting operation. During a forward stroke in the eyelet setting cycle, the central pintle 36 connecting the toggle rod 37 to the drive lever 30 and the bearing 32 between the drive lever and the yoke 26 assume the positions 36 and 32 (from the "out" positions 36A and 32A, respectively, shown in dotted outline) illustrated in Figure 1, with the punch supporting yoke assembly being in the indicated solid outline and the other moving parts being in the indicated moved positions. The eyelet arresting rod 24 and the eyelet supporting and releasing spring 19 cooperate with the movement of the punch in the described fashion. Thus, as the nose 10 of the punch 8 catches the eyelet 15 when in its inserting position in the socket portion 20 of the spring 19 to set the eyelet in the workpiece against the lowered anvil 11, the eyelet arresting rod 24 is moved to retain the next eyelet 16 in penultimate position in the track 25 by being inserted therethrough to capture and retain eyelet 16 in the track. Eyelet 16 is so held until the punch 8 has retracted. This permits the spring 19 to return to a position wherein the socket portion 20 thereof can receive the eyelet 16, which is then the next eyelet to fall from the track, after release (subsequent to retraction of the punch) of the arresting arm 24. As is apparent, the feeding of the eyelets from the penultimate position in the supply track to their inserting position next to the anvil (or a work piece thereagainst) is advantageously accomplished in a very rapid, one-step, mechanically-unrestrained sequence. The entire setting stroke is devised to be practically instantaneous in order that the desired rapid eyeletting may be facilitated. In many operations, for example, the cam movement of the toggle rod 37 is so timed that the setting stroke is accomplished in one-twentieth of a second or less and the rapidity of sequential eyeletting that is attained is limited more by the time required to handle the articles being eyeletted than by the time that is necessary to actually perform the eyeletting. After each complete eyeleting cycle has been accomplished, the retraction of the arresting rod 24 permits the lowermost eyelet 16 in the track 25 to drop into the socket portion 20 of the spring 19 in anticipation of the subsequent cycle. As mentioned the penultimate feed eyelet is dropped from the lowermost position in the track without further mechanical restraint or manipulation after each retraction of the arresting rod. This results in the indicated one-step feed of eyelets from their supply position at the upsetting end of the track to their inserting position on the accommodating socket portion of the spring 19.

Apparatus in accordance with the invention is adapted to set as many as 250 to 500 or more eyelets per minute (or twice that amount in a duplex unit) in such items as cardboard dispensing containers for sheet wrapping materials and in other desired items being fabricated and physically handled on a mass production basis.

Persons who are skilled in the art will immediately recognize that certain changes and modifications in the practice of the present invention can be entered into readily without substantially departing from its intended spirit and scope. As a consequence, the invention is not intended to be limited or restricted to or by the preferred deictic embodiments thereof which have been referred to in the foregoing description and specification. Rather, it is to be interpreted and construed in the light of what is set forth and defined in the hereto appended claims.

What is claimed is:

1. In combination in an eyeletting apparatus: a vertically disposed anvil; means for supporting a work piece in vertical disposition against said anvil; means for guiding gravity-fed eyelets to a penultimate feeding position substantially immediately adjacent to and above an ultimate inserting position next to and opposite said anvil; means for releasing said eyelets to permit movement thereof from said penultimate feeding position to said ultimate inserting position in a single free falling movement; a horizontally operating punch for inserting said eyelets from said ultimate inserting position through said work piece and for setting said eyelets in said work piece against said anvil when said work piece is positioned at said supporting position; and means for holding said eyelets in said penultimate feeding position during said eyelet inserting operation of said punch.

2. The combination of claim 1, wherein the eyelet in said penultimate feeding position is held therein on a center that is at least an eyelet diameter from the center of the eyelet in said ultimate inserting position.

3. In combination in an eyeletting apparatus: a vertically disposed anvil; means for supporting a work piece in vertical disposition against said anvil; means for guiding gravity-fed eyelets to a penultimate feeding position immediately physically adjacent to and above an ultimate inserting position next to and opposite said anvil, a portion of the eyelet in said penultimate feeding position being in physical contact with a portion of the eyelet in said inserting position; means for releasing said eyelets to permit movement thereof from said penultimate feeding position to said ultimate inserting position in a single free falling movement; a horizontally operating punch for inserting said eyelets from said ultimate inserting position through said work piece and for setting said eyelets in said work piece against said anvil when said work piece is positioned at said supporting position, and means for holding said eyelets in said penultimate feeding position during said eyelet inserting operation of said punch.

4. In combination in an eyeletting apparatus, a vertically disposed anvil; means for supporting a work piece in vertical disposition against said anvil; a vertical track for guiding gravity-fed eyelets to a lowermost penultimate feeding position in said track wherein each eyelet so situate is immediately physically adjacent to and above the preceding eyelet that is in an ultimate inserting position next to and opposite said anvil, a portion of the eyelet in said penultimate feeding position in said track being in physical contact with a portion of the eyelet in said inserting position; means for releasing said eyelets from the lowermost portion of said track to permit movement thereof from said penultimate feeding position to said ultimate inserting position in a single free falling movement; a horizontally operating punch for inserting said eyelets from said ultimate inserting position through said work piece and for setting said eyelets in said work piece against said anvil when said work piece is positioned at said supporting position; and means for holding the eyelet lowermost in said track in said penultimate feeding position during said eyelet inserting operation of said punch.

5. The combination of claim 4, wherein said means for holding the eyelet in said penultimate feeding position lowermost in said track is an arresting rod adapted to move in synchronism with said punch and to impale said eyelet during the eyelet inserting operation of said punch.

6. The combination of claim 4 and including, in addition thereto and in combination therewith, means for raising said anvil away from the work piece after completion of the eyelet inserting operation of said punch.

7. In combination in an eyeletting apparatus, a vertically disposed anvil; means for supporting a work piece in vertical disposition against said anvil; a vertical track for guiding gravity-fed eyelets from a supply point therefor to a lowermost penultimate feeding position in said track for said eyelets; a resiliently supported eyelet holder beneath said track for receiving the lowermost eyelet from said penultimate feeding position in said track and maintaining said eyelet in an ultimate inserting position for said eyelets next to and opposite said anvil; the eyelet in said penultimate feeding position lowermost in said track being immediately physically adjacent to and above the eyelet in said ultimate inserting position on said holder, a portion of the eyelet in said penultimate feeding position in said track being in physical contact with a portion of the eyelet in said inserting position on said holder; means for releasing said eyelets from the lowermost portion of said track to permit movement thereof from said penultimate feeding position to said ultimate inserting position on said holder in a single free falling movement; a horizontally operating punch for inserting said eyelets from said ultimate inserting position on said holder through said work piece and for setting said eyelets in said work piece against said anvil when said work piece is positioned at said supporting position; means for forcing said eyelet holder out of the way of said punch during the eyelet inserting operation of said punch; and means for holding the eyelet lowermost in said track in said penultimate feeding position during said eyelet inserting operation of said punch.

8. The combination of claim 7, wherein said means for forcing said eyelet holder out of the way of said punch are means on said punch for physically contacting and depressing said holder during the eyelet setting operation of said punch.

References Cited in the file of this patent

UNITED STATES PATENTS

| 1,495,753 | Levine | May 27, 1924 |
| 2,097,248 | Havener | Oct. 26, 1937 |
| 2,163,440 | Tomkins | June 20, 1939 |
| 2,176,304 | Kalning | Oct. 17, 1939 |
| 2,785,819 | Markey | Mar. 19, 1957 |